June 14, 1938. A. L. V. C. DEBRIE 2,120,735
ADJUSTABLE DRIVE ROLL FOR DEVELOPING MACHINES FOR FILMS AND THE LIKE
Filed June 2, 1936
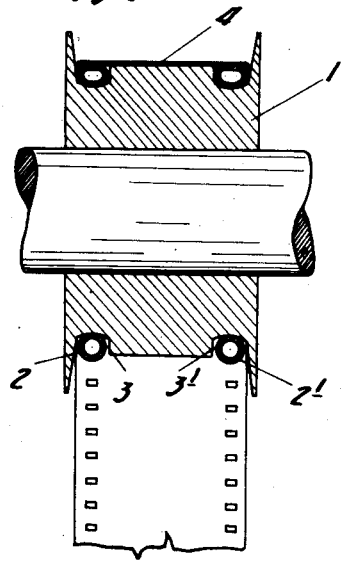
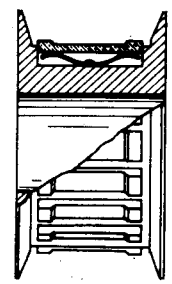
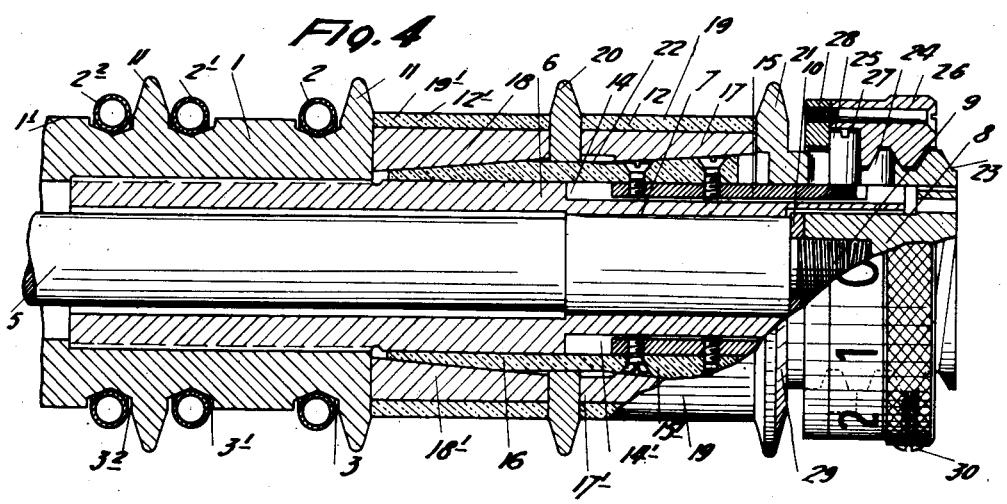

Patented June 14, 1938

2,120,735

UNITED STATES PATENT OFFICE 2,120,735

ADJUSTABLE DRIVE ROLL FOR DEVELOPING MACHINES FOR FILMS AND THE LIKE

André Léon Victor Clement Debrie, Paris, France

Application June 2, 1936, Serial No. 83,143
In France October 26, 1935

13 Claims.  (Cl. 271—2.3)

In the machines used nowadays for the development of films, the progress of the strip through the different developing, fixing, washing and drying parts is usually performed by means of toothed drums the pitch of which corresponds substantially with the pitch of the perforations of the film to be treated, the tension of the film passing through the machine being ensured by any suitable tensioning means such as a counterweight or a tackle. Now the drawback of this manner of operating lies in that it is liable to damage the perforations; it is known in fact that films lengthen more or less when they are wet whereas on the contrary an unavoidable gradual shrinkage occurs at the moment of drying; thus the toothwork of the drums being of uniform pitch, the latter is rarely in concordance with the pitch of the perforation while the films are being developed and dried. Moreover the presence of these toothed drums limits the machine to use a single type of film the perforations of which correspond to the toothwork of the drums.

To avoid this deterioration of the perforations and to allow at the same time the drive, without changing drums, of films of different widths, it has already been proposed to replace the toothed drums by smooth rollers for advancing the film through the apparatus; in order to ensure a proper drive of the strip in spite of any variations in length thereof, it has also been proposed to give the diameter of contact between these rollers and the film successively larger and smaller values in accordance with the lengthening or shortening of the film so as to avoid too great a tension or on the contrary a loosening of the film on the rollers. But, in practice, this variation in diameter can be applied only in an approximative manner as the different rollers are of predetermined diameters which it is impossible to adjust with perfect accuracy so as to provide an equal tension of the film throughout the machine and moreover, all films do not possess the same coefficient of expansion or retraction. Consequently the films or portions of films under treatment are either too much tensioned between certain driving or guiding elements and incur the danger of breaking or on the contrary they are too loose between other elements and slip over the rollers.

My invention has for its object an improvement in smooth roller machines which allows these drawbacks to be avoided and causes the film to retain during the development, fixing, washing, drying and the like treatments, a uniform tension throughout its length. It consists chiefly in executing these rollers in a manner such that their useful diameter varies automatically in accordance with the traction exerted by the film, said diameter decreasing when the traction increases and on the contrary increasing when the traction decreases. To this end the rollers are yieldingly compressible and extensible within sufficiently wide limits so as to respond to the variations in speed of the machine which it is necessary to impress on the film for making up for its variations in length and for keeping its tension constant.

As it enters the machine, the drive of the film must be performed in a positive manner, i. e. without the least slipping. To this end the first roller or rollers must be of a preferably adjustable diameter which is constant or in any case little liable to variation, said diameter being smaller than that of the following self-adjusting rollers when these are completely expanded but greater than their diameter when these are at their maximum compression.

These first rollers are constituted preferably by a yielding sheath fitted over a conical sleeve through the agency of wedges with reference to which the sleeve moves longitudinally so as to ensure the extension or the contraction of the sheath. By reason of this extensibility, the delivery of the film at the entrance of the machine may be brought to correspond with that provided by the following rollers the diameter of which is determined automatically by the film itself, as it extends or retracts to varying extents.

My invention is capable of a very large number of forms of execution. A certain number of them are illustrated by way of example in appended drawing.

Figs. 1, 2 and 3 are sectional views of a roller according to my invention.

Figs. 4 and 5 are longitudinal and transversal cross-sections of the mounting of the first rollers, having a constant adjustable diameter, of a developing machine.

In Fig. 1 the roller 1, of any suitable material, for instance of moulded material or composition carries near each side a hollow ring 2—2', of rubber, forming an air chamber. In particular these rings may partially engage circular grooves 3—3' provided in the roller for holding them in position.

The film 4 bears against the rings 2—2' which are more or less flattened according as to whether the film, as it extends or retracts, bears against these rings with more or less strength; thus the outer useful diameter of the roller adjusts itself automatically in accordance with the traction of the film which is being unwound.

It should be noted that the use of rubber material or the like for forming the bearing surface of the film, increases the adherence of the latter and consequently improves the conditions of drive.

As other possible forms of execution I may mention, by no means in a limitative manner, the use of a yielding sheath, of rubber for instance, preferably sponge rubber, covering the whole of the periphery of the roller or only part thereof, the sheath being in this latter case, if desired, partially fitted into the roller body, said body being provided with lateral bearings against which the sides of the film may bear when the projecting part of the rubber sheath is completely compressed by the central portion of the film into the part of the roller in which it fits (Fig. 2).

I may also mention the arrangement on the periphery of the roller of small bars submitted to the action of springs (Fig. 3) or the like compressible independent parts also the use of elastic segments, of spring blades with sliding ends, etc. My invention is of course applicable to all rollers for film transportation, driving rollers, guiding rollers and the like.

Fig. 4 shows in axial cross-section the carrier axis 5 for the adjustable diameter rollers 12—12' over which the film enters the machine and which are followed by rollers 1—1' of the just described self-adjusting diameter type. This carrier axis 5 arranged at the entrance of the developing machine carries a sleeve 6 adapted to rotate over the bearing portion 7 on the axis 5; a nut 8 held over the threaded end 9 of the axis and an intermediary washer 10 serve as an abutment for this sleeve. Over the sleeve 6 are mounted the self adjusting rollers 1—1' having a flange 11 and carrying hollow rubber rings 2—2¹—2² forming air chambers; these rings engage partly the circular grooves 3—3¹—3² of the rollers which grooves hold them in position; the film as it lengthens or shortens bears against these rings, as has been described hereinabove with more or less force so that the useful diameter of the roller adapts itself automatically to the traction of the film being unwound. The rollers 1—1' are controlled by the usual driving mechanism not shown.

The constitution of the two first rollers 12—12' having a constant adjustable diameter is the following: the sleeve 6 carrying the rollers 12—12' has two diametrically opposed grooves 14—14' in which may slide two cotters 15—15' the rearward ends of which form radial tails 25; these cotters are secured for instance through screwing inside a sleeve 16 adapted to move longitudinally over the sleeve 6; the sleeve 16 is outwardly conical and a certain number of wedge shaped parts 17—17'—18—18' are distributed over the periphery of this sleeve along two rows corresponding each to a roller 12 or 12'. The bearing surface of these rollers 12—12' is constituted by a yielding sheath, 19 for the first roller and 19' for the second, stretched over the periphery of the corresponding wedges; an intermediary flange 20, through the central aperture of which the cylindrical part 22 of the sleeve 16 may slide freely, serves for guiding the film over the rollers 12—12'. A similar flange 21 is provided in front of the outer end of the roller 12. This flange 21, integral with the sleeve 6, comprises a tail-piece 23 outwardly threaded so as to form a worm and provided with two longitudinal recesses 24 extending over a certain length and inside which the tails 25 of the cotters 15—15' are adapted to move longitudinally.

Lastly a ring, knurled outwardly, 26 forms a nut over the end-piece 23 and comprises a circular inner groove 27 enclosing the tails 25, a thrust washer 28 being secured to the rear end of the ring 26 so as to come into contact with the flange 21.

The working is as follows: the rotation of the threaded ring 26 causes the cotters 15—15' and thereby the sleeve 16 to move longitudinally through the agency of the cotter tails 25; the conicity of the sleeve 16 causes the wedges 17—17'—18—18' to move concentrically away from or towards one another; the yielding sheaths 19—19' ensuring always the correct positioning of the wedges, the radial displacement of the latter produces the desired change in diameter of the two first rollers 12—12' by reason of the expansion or of the retraction of the yielding sheath.

In order to register the adjustment provided for the diameter of the rollers, I use a scale engraved on the outside of the ring 26 and cooperating with a mark 29 on the outer surface of the flange 21. This arrangement allows the relative rotation of the nut to be ascertained which ensures the displacement of the wedges providing a predetermined diameter of roller; a set screw 30 prevents any rotation of the ring-nut with reference to the flange once the adjustment is made.

Obviously many modifications may be brought to the devices disclosed without widening the scope of the invention as defined in appended claims.

What I claim is:

1. In a film-developing machine the provision of entrance film-driving rollers having a constant adjustable diameter and of further film driving rollers having yieldingly compressible and extensible film bearing surfaces.

2. In a film-developing machine, the provision of entrance film driving rollers having a constant adjustable diameter and of further film driving rollers provided with at least one annular recess and including a yielding chamber fitted in each recess for forming the film-bearing surface.

3. In a film-developing machine the provision of entrance film driving rollers having a constant adjustable diameter and of further film driving rollers including a yielding peripheric sheath fitted into its periphery.

4. In a film-developing machine the provision of entrance film-driving rollers having a constant adjustable diameter and of further film driving rollers including a yielding peripheric sheath fitted into the central part of its periphery.

5. In a film-developing machine the provision of entrance film-driving rollers having a constant adjustable diameter and of further film driving rollers including a plurality of outwardly projecting compressible parts carried along generating lines of the periphery of each of said further rollers.

6. In a film-developing machine the provision of entrance film-driving rollers constituted by a rotary carrier, a conical sleeve slidingly secured to said carrier, means controlling the longitudinal position of the sleeve with reference to the carrier, a plurality of radially arranged flat wedges bearing against the periphery of the sleeve, means for preventing said wedges from moving longitudinally with reference to the carrier and an outer yielding sheath passing round the outside of said wedges and further film driving rollers of self-adjusting diameter.

7. In a film-developing machine the provision of an entrance film-driving roller system constituted by a common rotary carrier, at least one conical sleeve slidingly secured to said carrier, common means controlling the longitudinal position of the sleeves with reference to the carrier, a plurality of radially arranged flat wedges bearing against the periphery of each sleeve, means for preventing said wedges from moving longitudinally with reference to the carrier and an outer yielding sheath passing round the outside of said wedges and further film driving rollers of self-adjusting diameter.

8. In a film-developing machine the provision of entrance film driving rollers constituted by a rotary carrier, a conical sleeve slidingly secured to said carrier, a projection with a raised part at one end of the sleeve, a threaded part on the end of the carrier beyond the projection on the sleeve, a nut adapted to be screwed on to said threaded part and adapted to engage the raised part of the projection for controlling the longitudinal position of the sleeve with reference to the carrier, a plurality of radially arranged flat wedges bearing against the periphery of the sleeve, means for preventing said wedges from moving longitudinally with reference to the carrier and an outer yielding sheath passing round the outside of said wedges and further film-driving rollers of self-adjusting diameter.

9. In a film-developing machine, the provision of film driving rollers each comprising a radially rigid substantially cylindrical support and substantially thick yielding covering means therefor adapted to vary substantially in thickness under the action of the variable pressure exerted by the film.

10. In a film-developing machine, the provision of film driving rollers each comprising a radially rigid substantially cylindrical support and a substantially thick yielding rubber sheath therefor adapted to vary substantially in thickness under the action of the variable pressure exerted by the film.

11. In a film-developing machine, the provision of film driving rollers each comprising a radially rigid substantially cylindrical support recessed at its periphery and a yielding airchamber fitted in each recess and adapted to be compressed in a variable manner up to a substantially considerable extent by the variable pressure exerted by the film.

12. In a film-developing machine the provision of film driving rollers each comprising a radially rigid substantially cylindrical support and a substantially thick yielding rubber sheath therefor fitted into the central part of said support and adapted to vary substantially in thickness under the action of the variable pressure exerted by the film.

13. In a film-developing machine, the provision of film driving rollers each comprising a radially rigid substantially cylindrical support and substantially thick yielding covering means therefor adapted to vary substantially in thickness under the action of the variable pressure exerted by the film, said covering means being constituted by a plurality of outwardly projecting compressible parts carried along generating lines of the periphery of the support.

ANDRÉ LÉON VICTOR CLEMENT DEBRIE.